United States Patent [19]
Ohtsuka et al.

[11] Patent Number: 5,778,254
[45] Date of Patent: Jul. 7, 1998

[54] RECORDING DEVICE WITH CONNECTION MEANS TO FIRST AND SECOND RECORDING DEVICE WITH SWITCH MEANS HAVING A PRESET CONNECTION PATTERN CONNECTING FIRST AND SECOND SELECTION SIGNALS

[75] Inventors: Tadashi Ohtsuka; Kazuhiko Koizumi; Tsutomu Nobutani, all of Suwa, Japan

[73] Assignee: Seiko Epson Corporation, Tokyo, Japan

[21] Appl. No.: 204,151

[22] PCT Filed: Jul. 2, 1993

[86] PCT No.: PCT/JP93/00935

§ 371 Date: Apr. 25, 1994

§ 102(e) Date: Apr. 25, 1994

[87] PCT Pub. No.: WO94/01864

PCT Pub. Date: Jan. 20, 1994

[30] Foreign Application Priority Data

Jul. 3, 1992 [JP] Japan ..................... 4-176404
Jun. 1, 1993 [JP] Japan ..................... 5-130803

[51] Int. Cl.$^6$ .......................................... G06F 13/14
[52] U.S. Cl. .............................. 395/858; 395/884
[58] Field of Search ........................ 360/69; 369/32; 395/425, 828, 858, 884, 892

[56] References Cited

U.S. PATENT DOCUMENTS

| | | | |
|---|---|---|---|
| 4,686,506 | 8/1987 | Farago | 341/100 |
| 4,858,038 | 8/1989 | Kazama | 360/69 |
| 4,890,179 | 12/1989 | Baker | 360/132 |
| 4,894,739 | 1/1990 | Kobayashi | 360/97.02 |
| 5,041,924 | 8/1991 | Blackborow et al. | 360/69 |
| 5,051,850 | 9/1991 | Takahashi | 360/73.03 |
| 5,097,439 | 3/1992 | Patriquin et al. | 395/402 |
| 5,133,060 | 7/1992 | Weber et al. | 395/425 |
| 5,293,601 | 3/1994 | Tsuyuguchi et al. | 395/425 |
| 5,327,549 | 7/1994 | Nissimov et al. | 395/425 |
| 5,335,338 | 8/1994 | Proesel | 395/500 |
| 5,420,998 | 5/1995 | Horning | 395/425 |

FOREIGN PATENT DOCUMENTS

| | | |
|---|---|---|
| 0 275 600 | 7/1988 | European Pat. Off. |
| 63-11792 | 1/1988 | Japan |
| 2-71478 | 3/1990 | Japan |
| 4-295684 | 10/1992 | Japan |
| 2 137 797 | 10/1984 | United Kingdom |

Primary Examiner—Thomas C. Lee
Assistant Examiner—Anderson I. Chen
Attorney, Agent, or Firm—Mark P. Watson

[57] ABSTRACT

A recording device having a plurality of recording mediums mounted thereon is disclosed. For example, in the recording device, a 5.25-inch floppy disk drive 1 and a 3.5-inch floppy disk drive 2 are attached to a front bezel 3, drive 2 being pre-connected to drive 1 inside the recording device by a flat cable so that the connection of the device with a host is achieved by connecting drive 1 side to the host. Thus, it is not necessary to connect a cable to each recording medium. Further, it becomes possible to add functions to drive 1 for setting signals for selecting the respective drives and to use drive 1 as the output buffer of the other drive.

15 Claims, 8 Drawing Sheets

RECORDING DEVICE WITH CONNECTION MEANS TO FIRST AND SECOND RECORDING DEVICE WITH SWITCH MEANS HAVING A PRESET CONNECTION PATTERN CONNECTING FIRST AND SECOND SELECTION SIGNALS

BACKGROUND OF THE INVENTION

The present invention relates to recording devices for mounting a plurality of recording mediums such as floppy disk drives, optical disks, RAM cards, etc., and more particularly, it relates to a recording device in which a plurality of recording mediums may be controlled from an external information processing device or the like through a single cable or a set of cables.

Various recording mediums including floppy disks, optical disks such as a CD-ROM, and RAM card or ROM card in the form of a card are used as an external storage device of an information processing apparatus such as a personal computer. Some recording devices for effecting recording, regeneration and erasing on these recording mediums have been developed as a single recording device with a plurality of recording mediums mounted thereon. In the recording mediums and the recording device for handling digital data, for example, since reduction in size of the mediums or the device is making a progress because of improved recording density, etc., it is now possible to mount a recording device having a thin type 5.25-inch FDD and a 3.5-inch FDD in a space where a floppy disk drive (FDD) of 5.25-inch type has conventionally been mounted in. Also, it is possible that a plurality of thin type 3.5-inch or 5.25-inch FDDs, or a 5.25-inch FDD and a 3.5-inch FDD are mounted in the space where a plurality of the conventional 5.25-inch FDDs have been mounted in so that a vacant slot thereof is used for a recording device such as a CD-ROM. Not only one combining a plurality of FDDs but also a recording device having a combination of FDD, CD-ROM, etc., mounted thereon is possible.

Figure 9:
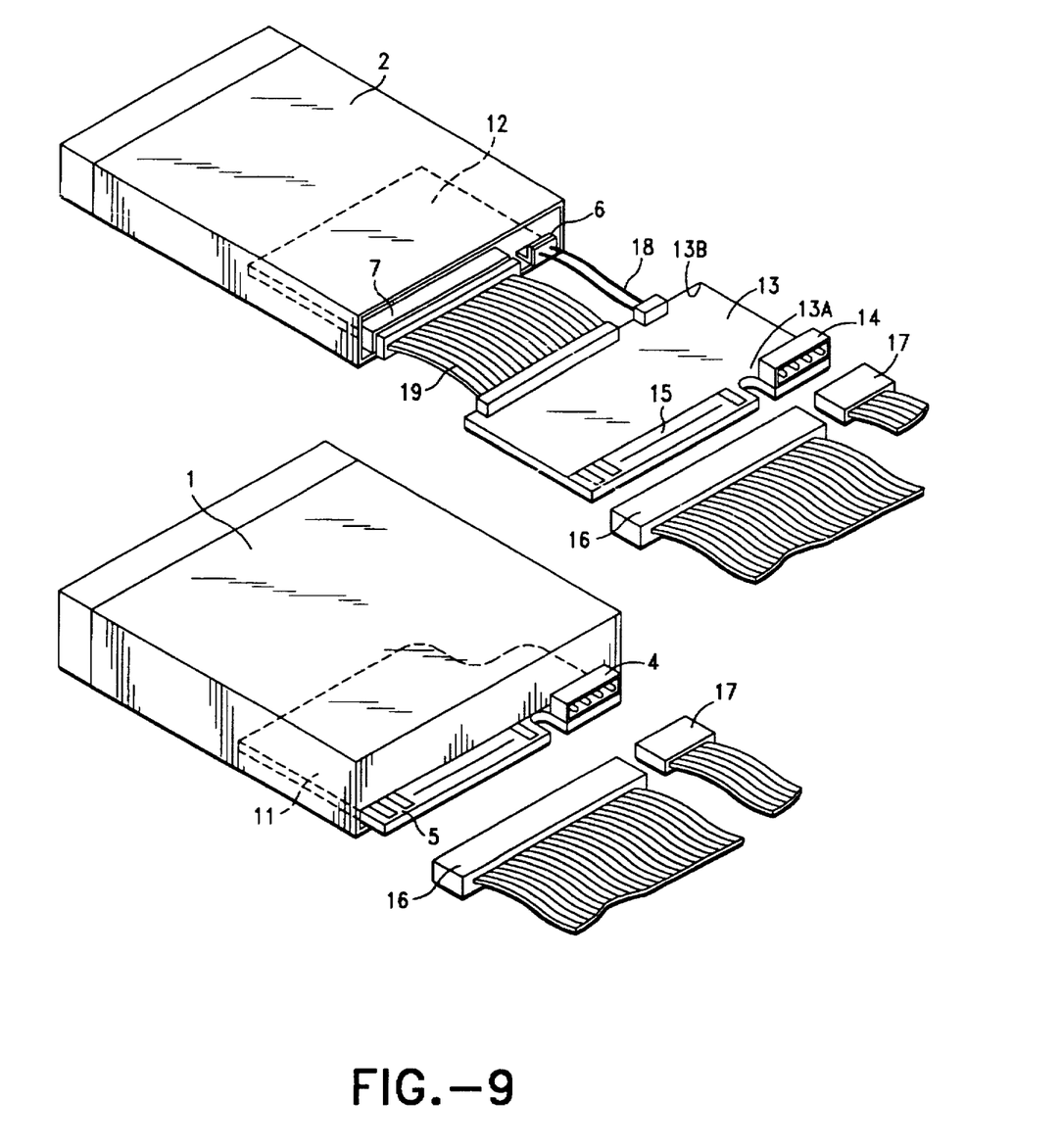
FIG. 9 is a diagram showing in an extended manner an ordinary connection for combining two types of recording devices.

FIG. 9 shows how a 5.25-inch FDD and a 3.5-inch FDD are combined and are connected to a computer on a host side. In general, since power interface connectors and/or signal interface connectors are of different types between a 5.25-inch FDD and a 3.5-inch FDD, a power interface connector 17 and a signal interface connector 16 for a 5.25-inch FDD are provided for the host system which corresponds to the 5.25-inch FDD. Accordingly, if 3.5-inch FDD is to be connected thereto together with the 5.25-inch FDD, it is necessary to connect the 3.5-inch FDD through an adapter board 13. A card edge 15 and a connector 14 which are respectively identical to an interface card edge 5 and a power interface connector 4 of a control board 11 of the 5.25-inch FDD are provided on one end 13a of adapter board 13. Further, provided on the other end 13b of adapter board 13 are a connector corresponding to a signal interface connector 7 of a control board 12 of the 3.5-inch FDD and a connector corresponding to a power interface connector 6. Thus, by connecting connecting end 13b of adapter board 13 and the 3.5-inch FDD to each other through a power interface cable 18 and a signal interface cable 19, the 3.5-inch FDD may be connected to the host system by means of connectors 16 and 17 which are compatible with the 5.25-inch FDD.

Figure 10:
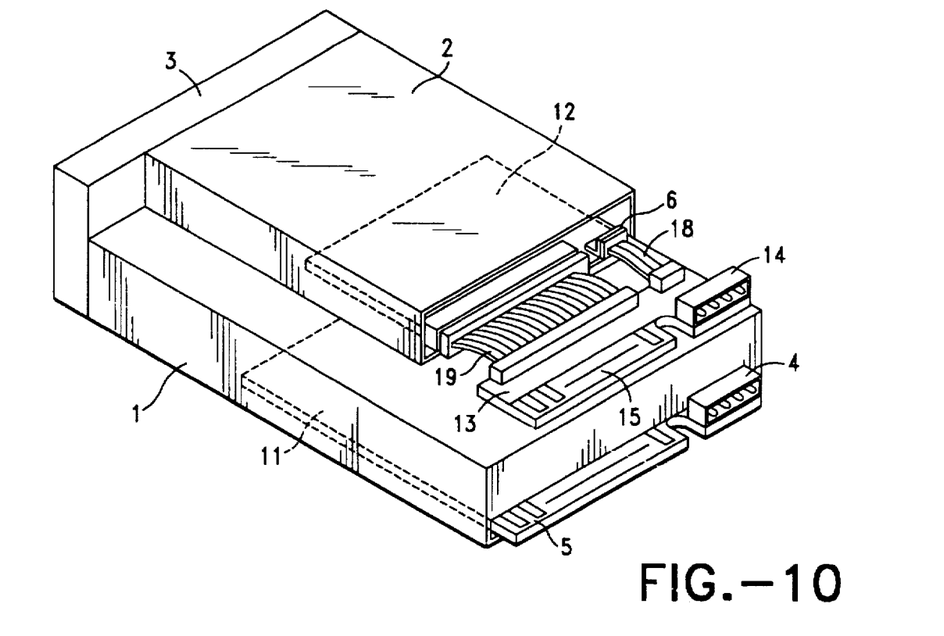
FIG. 10 is a perspective view showing a conventional recording device into which two types of recording sections are incorporated, as seen from a rear side of the device.

Shown in FIG. 10 is a recording device in which thin types of a 5.25-inch FDD and a 3.5-inch FDD are attached to and incorporated into an outer frame (front bezel) 3. An FDD device having such a dual construction is disclosed, for example, in Japanese Utility Model Laid-Open No.63-11792 in which the basic construction is similar to that of the recording device shown in FIG. 9. To achieve a compatibility of the connector on the host side corresponding to 5.25-inch FDD with a 3.5-inch FDD 2, adapter board 13 is mounted on a 5.25-inch FDD 1. In the recording device shown in FIG. 10, two signal interface connectors 5 and 15 and two power interface connectors 4 and 14 are provided for two drives of the recording mediums respectively of 5.25-inch and 3.5-inch.

In the conventional recording device having a 5.25-inch FDD and a 3.5-inch FDD as shown in FIGS. 9 and 10, two cables, a power interface cable and a signal interface cable, are necessary for each FDD to be connected to the host side.

Figure 11:
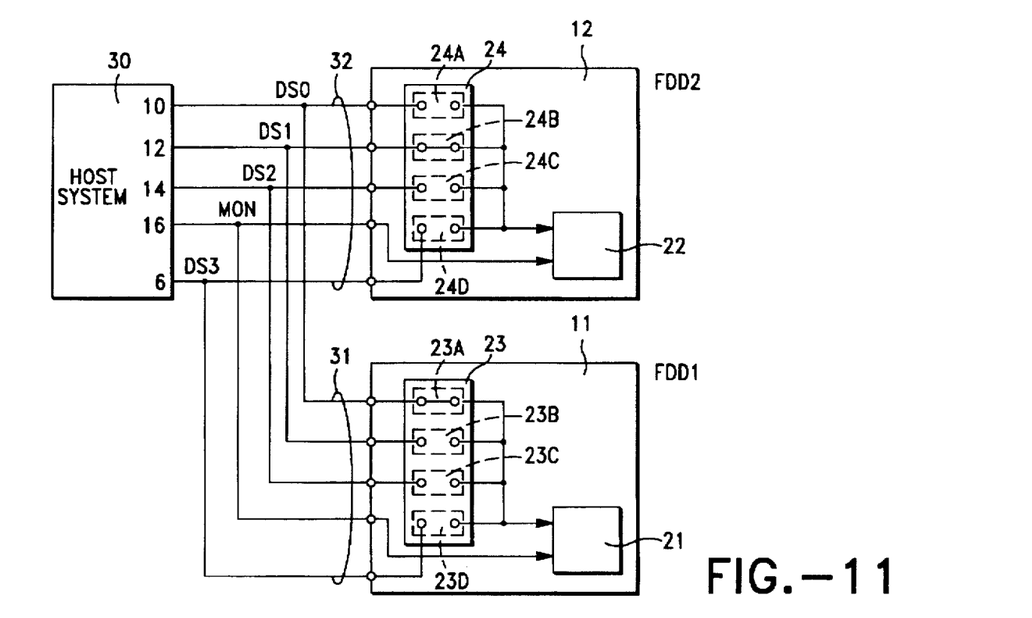
FIG. 11 is a connection circuit diagram showing an example of connecting the recording device in FIG. 10 to a host in the manner of a daisy chain.

When the recording device shown in FIG. 9 or 10 is to be connected, a host side may not be provided with a plurality of interfaces corresponding to the respective FDDs. For example, a recording device with two or more FDDs mounted in one conventional slot as described may be installed. In such a case, the two FDDs are usually connected in the manner of a daisy chain. An example illustrating the daisy chain connection is shown in FIG. 11. While a host side 30 and the 5.25-inch FDD (FDD 1) as well as the 3.5-inch FDD (FDD 2) are connected by means of a signal interface cable and a power interface cable, only the connection of interface signals for controlling the operation of FDD 1 and FDD 2 are shown in this figure. Host side 30 and FDD 1 are connected to each other through a cable 31 which provides a route for interface signals. FDD 2 is connected to host side 30 through a cable 32 which branches from cable 31. A drive select signal (DS signal) and a motor-on signal (MON signal) on cable 32 are supplied to control ICs 21 and 22 of the respective FDDs 1 and 2 through selector switches 23 and 24 which are provided on control board 11 of FDD 1 and control board 12 of FDD 2, respectively.

By selectively closing (turning on) a predetermined switch of selector switches 23 and 24, FDD 1 or FDD 2 may be selected by a predetermined DS signal of host side 30, thereby establishing an access between the respective FDD and the host. Accordingly, if one interface is provided on the host side to thereby control a plurality of FDDs independently from one another, it is necessary to provide a selector switch on each FDD. Further, since, in the connection shown in FIG. 11, the MON signal is common to both FDD 1 and FDD 2, motors of FDD 1 and FDD 2 are concurrently brought into their operating condition when the MON signal is turned on. Further, if the selector switch is incorrectly set, both FDDS are concurrently accessed which is a disadvantage.

A detailed description will now be given with respect to the DS signal and the operation of selector switches 23, 24. A 34-pin interface is provided on host side 30, and a DS0 signal from pin No. 10, a DS1 signal from pin No. 12, a DS2 signal from pin No. 14, a MON signal from pin No. 16 and a DS3 signal from pin No. 6 are supplied therefrom. The system on the host side selects an FDD to be accessed by activating one of the signals DS0–DS3. Further, by activating the MON signal, the motors of FDD are operated. In the case where the selector switches are set so that an access to FDD 1 is established upon activating the DS0 and an access to the FDD 2 is established upon activating the DS1, only a switch 23a of selector switch 23 to which the DS0 signal is supplied is closed, and switches 23b, 23c, 23d are opened. For selector switch 24, only a switch 24b to which the DS1 signal is supplied is closed and switches 24a, 24c, 24d are opened. By setting in this manner, selector switch 23 of FDD 1 accepts only the DS0 signal from the host system and supplies it to control IC 21, while not accepting other DS1–DS3 signals. On the other hand, selector switch 24 of FDD 2 accepts only DS1 signal from the host system and supplies it to control IC 22, while it does not accept other DS0, DS2, DS3 signals. Since signals other than the DS signals are supplied in common to both control ICs 21, 22 of FDD 1 and FDD 2, respectively, the FDD selected by the DS signal is controlled by these signals, whereby an access to the host side is established. In this manner, in order to access a plurality of FDDs from one interface which is provided on the host side, it is necessary to accurately provide the respective setting of the selector switch which is provided on each FDD.

Figure 12:
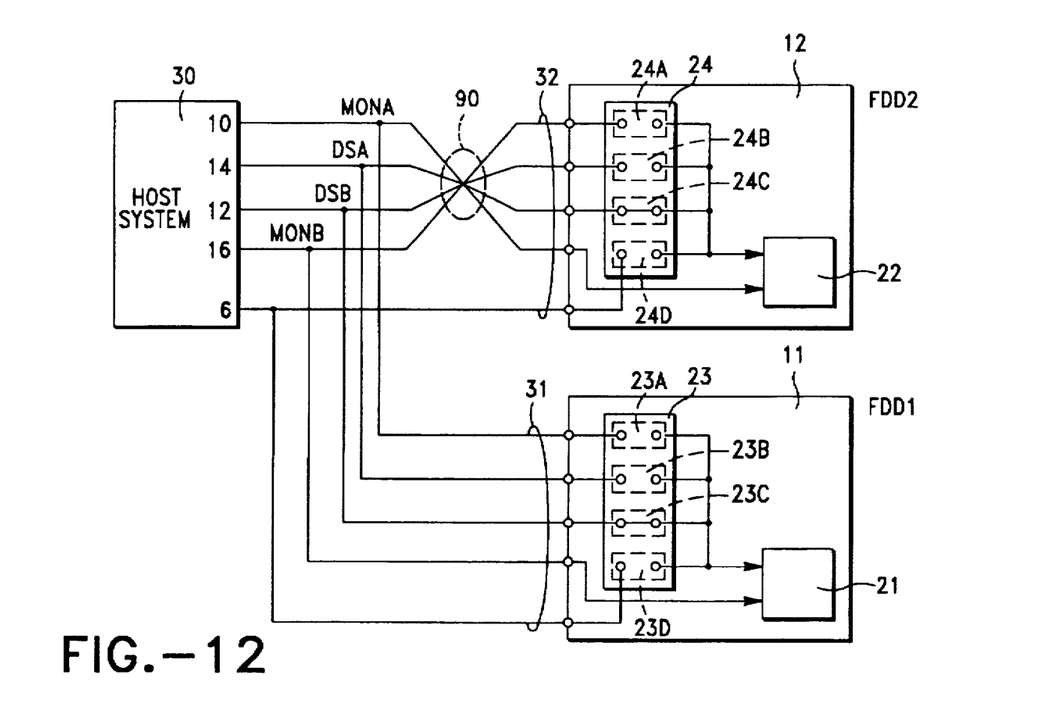
FIG. 12 is a connection circuit diagram showing another example of connecting the recording device in FIG. 10 to a host in the manner of a daisy chain.

Shown in FIG. 12 is an example of the daisy chain connection in which the connection is made so that the motors of FDD 1 and FDD 2 may also be controlled independently from each other. The construction of control boards 11, 12 of FDD 1 and FDD 2, respectively, are identical to that in FIG. 11. Accordingly, in order to control the motors independently from each other, it is necessary, unlike the connecting method shown in FIG. 11, to provide a connection so that different signals may be input to the identical pins on the interfaces of control boards 11, 12. In order to change the connecting order of the interface, it is usually necessary to change the cable array by twisting interface cable 32 to FDD 2 at a mid-point thereof as indicated by a reference numeral 90.

A detailed description will now be given with respect to the DS signal and the MON signal in this figure. Of the 34-pin interface on the host side: pin No. 10 outputs a motor-on A signal (MONA signal); pin No. 14 outputs a drive select A signal (DSA signal); pin No. 12 outputs a drive select B signal (DSB signal); and pin No. 16 outputs a motor-on B signal (MONB signal). To select FDD 2 by the A drive, i.e., DSA signal as seen from host side 30, only switch 24c of selector switch 24 is closed and switches 24a, 24b, 24d are opened. At this time, since it is necessary to set FDD 1 as the B drive, only switch 23c of selector switch 23 is closed and switches 23a, 23b and 23d are opened. As a result, setting of the selector switch is identical between FDD 1 and FDD 2. Since twisting 90 occurs in interface cable 32, MONA signal for instructing turning on of the A-side motor is connected to an MON input of FDD 2. The MONB signal for instructing turning on of the B-side motor is connected to an MON input of FDD 1 by interface cable 31. Thus, if the DSA signal and the MONA signal are activated, only the motor of FDD 2 is turned on to establish an access between FDD 2 and host 30. On the other hand, if the DSB signal and the MONB signal are activated, only the motor of FDD 1 is turned on to establish an access between FDD 1 and host 30. As described, in order to control the respective motors independently from each other when FDDs having control boards of an identical construction are connected, it is necessary to provide a daisy chain connection with interface cable 32 being twisted. At this time, while each FDD may be independently controlled by making setting of the selector switch on the respective board to be identical in the manner as described, concurrent access to the both or no access to any FDD may occur if setting of the selector switches is incorrect.

Further, one of the problems in connecting a plurality of FDDs to a host is that signals for an output interface to be output from the respective FDDs occur more frequently where noise affecting the recording operation may be generated due to a switching current at the time of such switching operation. Specifically, in the interface connection with a host, a 7438-equivalent is generally used as the line driver irrespective of whether the signal is supplied from the host side or from the FDD's side and it is output in an open-drain state. Accordingly, pull up of the output interface signal from the FDD to be supplied to the host side is performed at the host system which is the line receiver side. A value of about 150Ω is employed as the pull-up resistance on the host side so that excellent transfer characteristics may be obtained even with a longer cable. Thus, when signals in the output interface such as read data signal (RD signal), index signal, track 00 signal, write protect signal, ready/disk change signal, etc., are operated, a large current of about 40 mA is to be turned on and off at a high speed within the FDD. If on and off of a large current is frequently effected while recording or regeneration is being performed at the FDD of a recording device, an electromagnetic field is generated by such switching current and it effects the magnetic head, for example, of the FDD thereby causing noise in recording or regeneration.

These problems are not only related to FDDs but also are common in those recording devices with a plurality of recording mediums such as optical disks mounted thereon. Accordingly, it is an object of the present invention to provide a recording device capable of having a plurality of recording mediums mounted thereon. The construction of the device is simple, and it may be easily connected to a host. Also, the disadvantages and occurrence of the noise as described in connecting to a host side in such a recording device may be eliminated. Further, it is another object of the present invention to provide a recording device of a relatively smaller size with a high level of performance.

SUMMARY OF THE INVENTION

The present invention provides a recording device which may be connected to a host without twisting or the like of an interface cable. Further, it provides a recording device in which problems such as concurrent access to a plurality of recording mediums due to erroneous setting of selector switches may be prevented. Additionally, it provides a recording device in which reliability is improved by minimizing the effect of switching current even though a plurality of recording mediums are mounted thereon.

In a recording device according to the present invention, a plurality of recording sections each capable of mounting a recording medium are connected to each other by means of at least one flat cable or the like. In the case where the recording mediums are of different types, e.g., where floppy disks of different sizes are mounted or where a floppy disk and a CD-ROM are mounted, connection conversion means corresponding to the respective connection is provided. Specifically, a recording device capable of mounting a plurality of recording mediums according to the present invention has a first recording section for performing at least one of recording and regeneration of digital data to and from a first recording medium, and a second recording section for performing at least one of recording and regeneration of digital data to and from a second recording medium which is of a different type from the first recording medium. An internal connection means for connecting the first recording section and the second recording section is provided. A connection conversion means for converting the connection arrangement between the first recording section and an external equipment in accordance with the second recording section is provided in the internal connection means so that a connection with a host side can be made by a single or one set of interface cable.

In the recording device according to the present invention, the second recording section is connected to the first recording section by means of the internal connection means and is connected to an external equipment through the first recording section. Thus, it is not necessary to attach an interface cable for directly connecting the second recording section to the host side. Further, conversion between different types of recording sections is possible by a connection conversion means provided in the internal connection means, without separately providing an adapter board. For example, in the case where the first recording section and the second recording section are connected to each other by means of a connecting member such as a flat cable, the wiring combination or the like of the flat cable may be converted on the cable. Alternatively, it may be converted at the connecting point with the wiring on the first recording section or on the second recording section. In the recording device having such construction, a so-called daisy chain connection and a conversion circuit are implemented by the recording device itself. Thus, its connection with the host side is very simple.

Further, in the recording device according to the present invention, even in the case of incorporating different types of recording mediums, it suffices to simply connect the first recording section and the second recording section by means of a connecting member such as a flat cable when the recording device is assembled. Thus, the number of the components constituting the recording device may be reduced and assembling of the recording device is also facilitated.

It is preferable that an external connection connector capable of connecting to an external device is provided at a rear end portion of the first recording section and an internal connection connector capable of providing connection to the second recording section is provided on a side end portion of the first recording section in a manner not causing an interference. The internal connection connector and a connection connector provided at a rear end portion of the second recording section may be connected to each other by a flat cable which provided as the internal connection means in the manner where it is bent. Thereby, installing of the cable is facilitated and the cable is suitably accommodated.

The present invention is not limited to a recording device capable of mounting a plurality of recording mediums of different types but it may also be applied to one capable of mounting a plurality of recording mediums of the same type. In such a recording device, at least two recording sections are connected to each other by means of an internal connection means and at least one of the recording sections which is connected by means of the internal connection means may be provided with: an external connection means for connecting the recording section to an the external device; a relay means for connecting the external connection means and the internal connection means; and a setting means for setting selection signals from the external device for selecting at least one of the recording sections. Further, it is also possible that signals for selecting the respective recording sections are respectively set at the setting means. A drive select signal or the like for allowing an access to that recording section, for example, is included in the selection signals.

Further, in a recording device where such recording mediums as a floppy disk or an optical disk to be driven are employed, in addition to signals for selecting a recording section, a signal for driving a recording medium such as a motor-on signal may be included in the selection signals.

Since selection signals of a plurality of recording sections which are connected to one another by means of an internal connection means may be set by a setting means which is provided on one of the recording means, setting operation is easy. Further, if, upon changing of setting of one recording section, setting of the other recording section is also changed, it is possible to prevent such a problem that two recording sections are concurrently accessed due to erroneous setting of the selection signals.

A switch means may be used as such setting means, which is capable of selectively turning on and off at least a portion of the connection at the relay means or the connection between the external connection means and a recording control means of one of the recording sections. Further, it may also be achieved by means for changing a combination of at least a portion of the connection at the relay means or the connection between the external connection means and a recording control means of one of the recording sections. A switchboard capable of being replaced and having a predetermined wiring pattern formed thereon may be used as the means for changing the combination. Alternatively, a logical means for performing at least a portion of the connection at the relay means or the connection between the external connection means and a recording control means of one of the recording sections may be used as the means for changing the combination so that the logical means is controlled by an external control means to effect the changing of the combination. In this case, it is also possible to achieve the recording control means, the logical means and the external control means on the same integrated circuit.

It is important for a recording device capable of having a plurality of recording mediums mounted thereon to suppress the noise due to switching current. In the recording device as described in which at least two recording sections are connected to each other by means of an internal connection means, an output driver means may be provided on at least one of the recording sections which are connected to each other by means of the internal connection means in such a manner as to be driven by a signal from the other recording section, so that signals of output interface may be output to an external equipment from the output driver means. By using one of the recording sections as the so-called output buffer of the other recording section, switching current may be suppressed to a lower level within the recording device on which a plurality of recording mediums are mounted, so as to suppress the occurrence of a noise.

For example, a signal output by means of an open-drain or an open-collector from the other recording section may be pulled up by a voltage applying means provided at the one recording section and it may be input to the output driver means. Since the distance, too, is shorter within the recording device, it is possible to set the resistance value for the pull up operation to a higher level, whereby current level of the signals exchanged through the internal connection means may be reduced to prevent it from being the cause of noise.

Other objects and attainments together with a fuller understanding of the invention will become apparent and appreciated by referring to the following description and claims taken in conjunction with the accompanying drawings.

BRIEF DESCRIPTION OF THE DRAWINGS

FIG. 4 is circuit diagram showing in detail the switchboard in FIG. 3 and the connection thereof, with the switchboard slot connections shown in FIG. 4A and alternate switchboard connections shown in FIGS. 4B and 4C.

DESCRIPTION OF THE PREFERRED EMBODIMENTS

Embodiment 1

Figure 1:
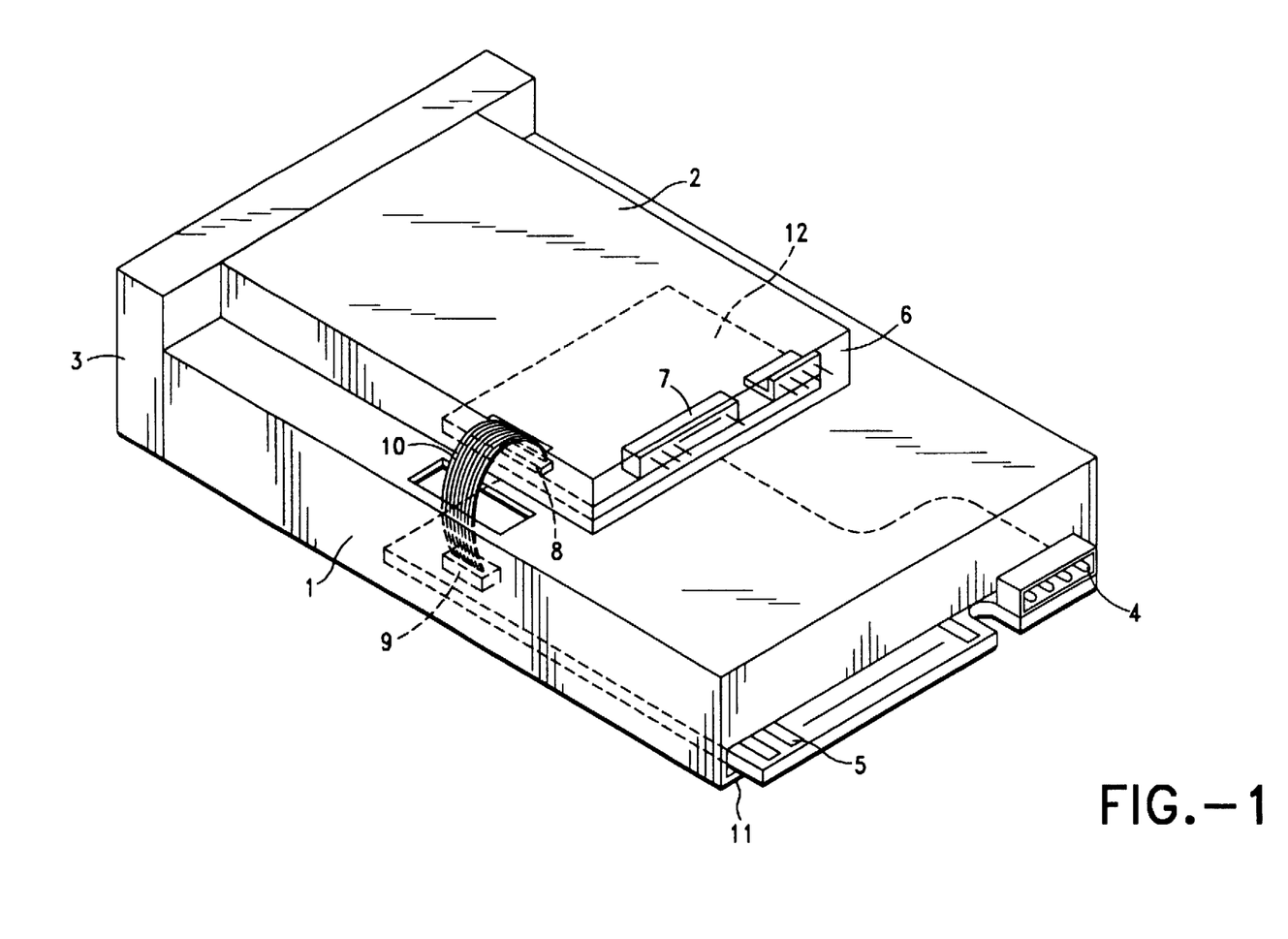
FIG. 1 is perspective view showing a recording device according to Embodiment 1 of the present invention, as seen from a rear side of the device, and illustrating the connection of the two recording sections.

In FIG. 1, a recording device having a 5.25-inch FDD 1 and a 3.5-inch FDD 2 is shown as an embodiment of the present invention. In this recording device, the 5.25-inch FDD 1 and the 3.5-inch FDD 2 are mounted at a front bezel 3 in an integrated manner, forming an FDD unit of a dual construction in which a 5.25-inch floppy disk and a 3.5-inch floppy disk may be inserted from front bezel 3, respectively. Each of FDDs 1, 2 is provided with a drive device (not shown) such as a motor and a recording/regeneration device such as a magnetic head for independently accessing an information processing device such as a personal computer.

An interface card edge 5 and a power interface connector 4 are provided on a control board 11 of the 5.25-inch FDD 1. Further, a signal interface connector 7 and a power interface connector 6 are provided on a control board 12 of the 3.5-inch FDD 2, so that each of FDDs 1, 2 may be connected to the host side. In the recording device of the present example, an internal connector 9 is further provided on control board 11. Also, an internal connector 8 is provided on control board 12. Here, internal connectors 8 and 9 are provided on the side end portions of boards 11 and 12, respectively, and they are connected to each other through a flat cable 10 which is attached on the side surface of the recording device.

Figure 2:
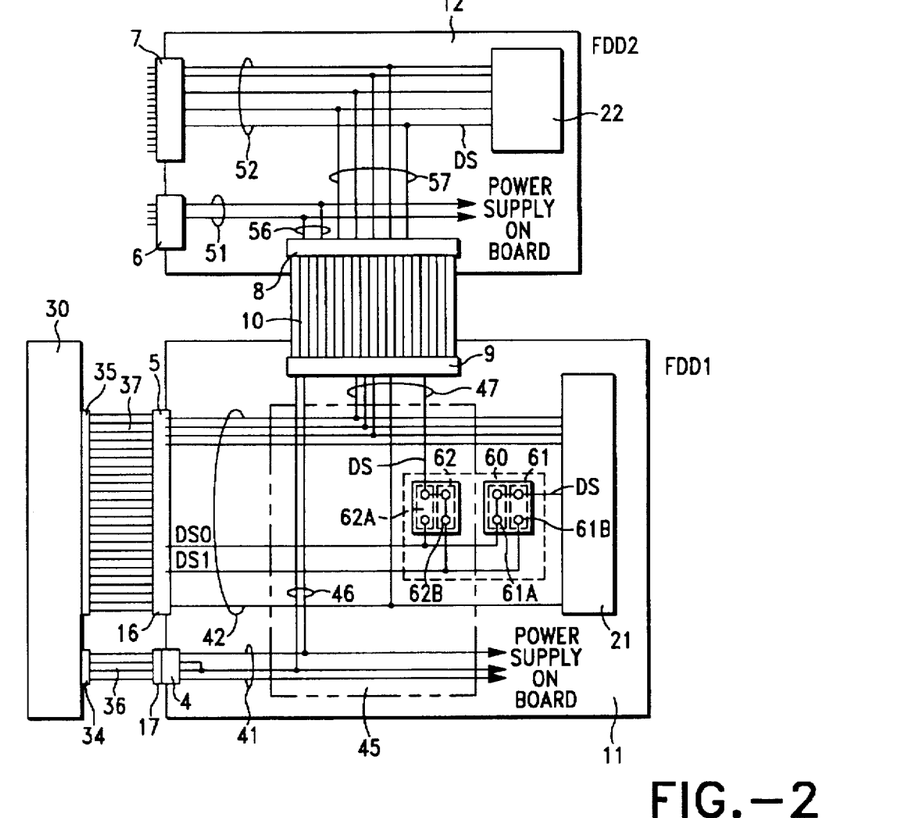
FIG. 2 is a circuit diagram showing an internal connection of the recording device in FIG. 1, illustrating the internal connection in the case where a selector switch is used.

The portion relating to the connection between control boards 11 and 12 is described in a connection circuit diagram of FIG. 2. The recording device shown in FIG. 2 is a recording device according to the present invention, adapted to be connected to a host 30 in which a connection interface with a 5.25-inch FDD is provided. The present also includes a recording device in which the construction on board 11 is provided to board 12 so as to connect them to a host having a connection interface for connecting to a 3.5-inch FDD.

Power interface connector 4 provided on board 11 of the 5.25-inch FDD 1 is connected to a power interface connector 34 of the host 30 by means of a connection cable 36 through a connector 17. A power supply wiring 41 for power on the board is provided from power interface connector 4 onto board 11, so that power is supplied from power supply wiring 41 to a control IC 21, etc., mounted on board 11. This power supply wiring 41 is connected to an internal connection wiring 46 at a relay region 45 on board 11. In this example, of the three lines of board power wiring 41 supplied from host 30, two lines are connected to internal connection wiring 46. Internal connection wiring 46 extends to internal connector 9 of FDD 1 and is connected to internal connector 8 of FDD 2 through flat cable 10. Then, on board 12 of FDD 2, wiring 46 is connected to two lines of a board power wiring 51 which extends from a power interface connector 6 of board 12 to an internal connection wiring 56.

Signal interface connector 5 provided on board 11 of FDD 1 is connected to a signal interface connector 35 of the host through a connection cable 37 and a connector 16. Signal interface connector 5 is connected to control IC 21 by means of a signal wiring 42 on board 11. Signal wiring 42 is connected to an internal connection wiring 47 at relay region 45 and internal connection wiring 47 extends to internal connector 9. Thus, internal connection wiring 47 for signals is connected to an internal connection wiring 57 of FDD 2 through flat cable 10 in a similar manner as the internal connection wiring 46 for power supply. On board 12, internal connection wiring 57 is connected to a signal wiring 52 which extends from signal interface connector 7 and is connected to control IC 22 of board 12. Since the connector array of signal interface connector 5 on board 11 and connector array of signal interface connector 7 on board 12 are different from each other and since the number of connections necessary for their access is also different, only those of signal wiring 42 which are necessary for FDD 2 are selected at relay region 45 as shown in FIG. 2 and are connected to internal connection wiring 47 in such an order as to facilitate their connection with wiring 52 on board 12 of FDD 2.

Further, in the recording device of this example, a selector switch 60 for setting a signal for selecting an FDD to be accessed (drive select signal: hereinafter referred to as DS signal) is mounted on board 11. Selector switch 60 of this example is constituted by two switches 61 and 62. Switch 61 is connected to signal lines of signal wiring 42 which transmits the DS0 signal and the DS1 signal from host 30, so that either DS0 or DS1 is selected at switch 61 and is transmitted to control IC 21. In other words, the signal wiring for transmitting DS0 is connected to one end of a short plug 61a of switch 61 while the signal wiring for transmitting DS1 is connected to a short plug 61b of switch 61. The other ends of short plugs 61a, 61b are short-circuited and are input to control IC 21.

In a similar manner as switch 61, switch 62 is also connected to the signal wiring for transmitting DS0 and DS1. The other end of switch 62 is short-circuited and is input to control IC 22 of FDD 2 through internal connection wiring 47, internal connector 9, flat cable 10, internal connector 8, internal connection wiring 57, and signal wiring 52.

The operation of the recording device of this example connected in the manner as described will now be described in the case where drive select switch 61 for FDD 1 (located on board 11) is set to the position of short plug 61a while drive select switch 62 for FDD 2 also located on board 11 is set to the position of short plug 62b. When a DS0 signal for selecting the drive of No. 0 is supplied from host 30 side, the DS0 signal reaches control IC 21 of FDD 1 on board 11 through signal interface connector 5, signal wiring 42, and drive select switch 61. This means that the 5.25-inch FDD 1 is selected from host 30 where an access between host 30 and FDD 1 is established. Thus, such operation as recording and regeneration with respect to a floppy disk in FDD 1 is instructed through a magnetic head or the like of FDD 1 and exchange of data with the host side is performed.

On the other hand, when a DS1 signal for selecting the drive of No. 1 is supplied, the DS1 signal reaches control IC 22 of FDD 2 through signal interface connector 5 of board 11, signal wiring 42, drive select switch 62, internal connection wiring 47, internal connector 9, flat cable 10, internal connector 8, internal connection wiring 57, and signal wiring 52. This means that the 3.5-inch FDD 2 is selected from host 30 where an access between host 30 and FDD 2 is established. In this case, data recorded/regenerated by a magnetic head or the like of FDD 2 is exchanged with host 30 through board 11 by way of a similar route as the DS1 signal. By setting drive select switch 61 to short plug 61b and by setting drive select switch 62 to short plug 62a, selection may also be respectively made of FDD 1 by DS1 signal and of FDD 2 by DS0 signal in a manner opposite to the above.

As described, in the recording device of this example, it is not necessary to connect an interface cable to signal interface connector 7 of FDD 2 to perform exchange of data between FDD 2 and the host side. This is because exchange of data is possible through signal interface connector 5 of FDD 1 which is connected to signal interface connector 7 by means of flat cable 10. FDD 1 and host 30 can exchange data through interface connector 5. It is similarly possible with respect to power supply.

Further, since the mediums in the recording device of this example are of different types, for example, of 5.25-inch type and 3.5-inch type, the combination of the interface connectors is different for FDD 1 and FDD 2. However, the combination of the signal wiring is converted by flat cable 10 so that it is adapted to the combination of the respective interface connectors. Thus, even if the host side is provided only with a connector corresponding to the 5.25-inch type, it can access the 3.5-inch FDD. It is not necessary to additionally provide an adapter board, etc., for this purpose.

Figure 3:
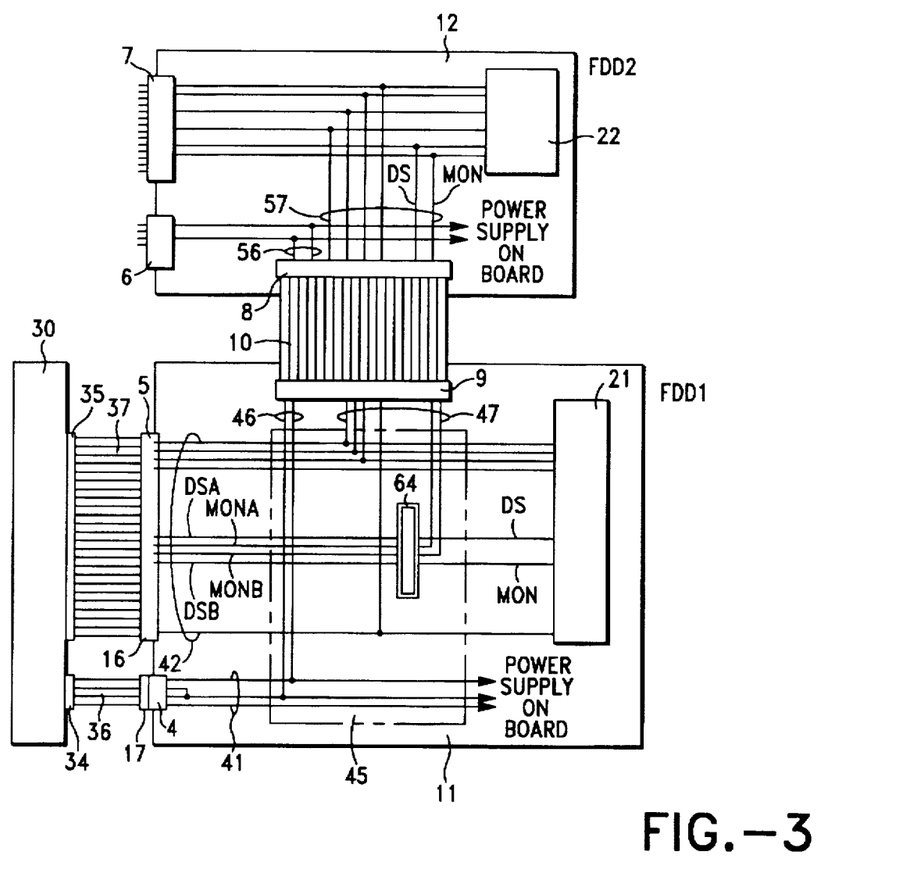
FIG. 3 is a circuit diagram of another embodiment showing an internal connection of the recording device in FIG. 1, illustrating the internal connection in the case where a switchboard is used.

An example using a switchboard 65 instead of selector switch 60 is shown in FIGS. 3 and 4. While the DS signal is switched in the example using selector switch 60 as shown in FIG. 2, the motors of FDD 1 and FDD 2 are started at the same time because the motor-on signal (MON signal) for controlling on and off of the drive motors is not changed over. In the following example, however, the MON signal may also be changed over so that the motors of FDD 1 and FDD 2 are separately controlled. This corresponds to the case of the previously described conventional device which has been described by way of FIG. 12 where it was necessary to twist the interface cable. Although the recording device having the connection wiring shown in FIGS. 3 and 4 employs switchboard 65, the construction of the other portions is substantially identical to that in the above described example. Like reference numerals are given to like portions and the description thereof will be omitted.

In the recording device of this example, a slot (switch connector) 64 into which switchboard 65 is inserted is provided at relay region 45. Those signal lines of signal wiring 42 through which DSA signal, DSB signal, MONA signal, MONB signal are supplied from the side of host 30 are input to this slot 64. Then, signal lines for supplying the DS signal and the MON signal to control IC 21 of board 11 from slot 64 are respectively connected to control IC 21. Signal lines for supplying the DS signal and the MON signal to control IC 22 of board 12 are respectively connected to control IC 22 through internal connection wiring 47, internal connector 9, flat cable 10, internal connector 8, internal connection wiring 57, and signal wiring 52.

Figure 4A:
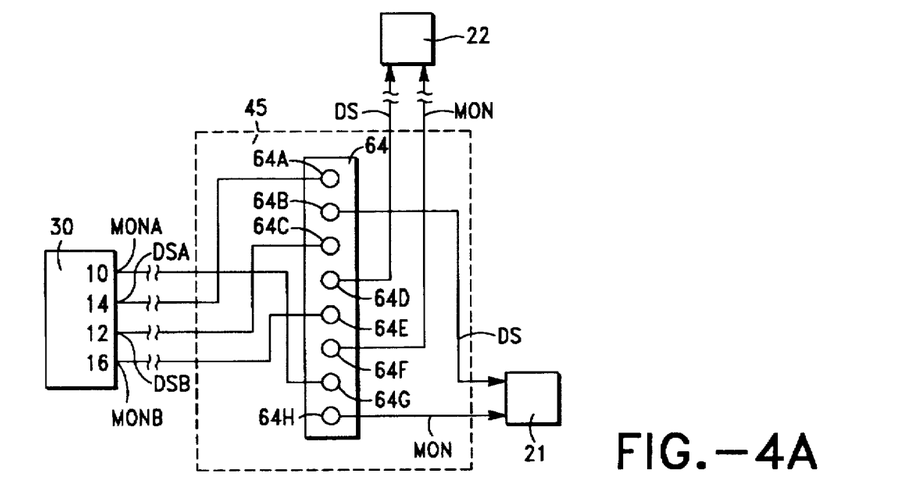

FIG. 4 shows in detail the wiring in the vicinity of slot 64 and the wiring in switchboard 65. Eight pins 64a–64h are provided in slot 64 of this example as shown in FIG. 4(A). The signal line to which the DSA signal is supplied from pin No.14 of host 30 is connected to pin 64a, and the signal line to which the DSB signal is supplied from pin No. 12 is connected to pin 64c. The signal line to which the MONB signal is supplied from pin No. 16 is connected to pin 64e, and the signal line to which the MONA signal is supplied from pin No. 10 is connected to pin 64g. The signal line for supplying the DS signal for selecting FDD 1 is connected to control IC 21 of FDD 1 from pin 64b, and the signal line for supplying the MON signal for turning on the motor of FDD 1 is connected to control IC 21 from pin 64h. Further, the signal line for supplying the DS signal for selecting FDD 2 is connected to control IC 22 of FDD 2 from pin 64d, and the signal line for supplying the MON signal for turning on the motor of FDD 2 is connected to control IC 22 from pin 64f.

Figure 4B:
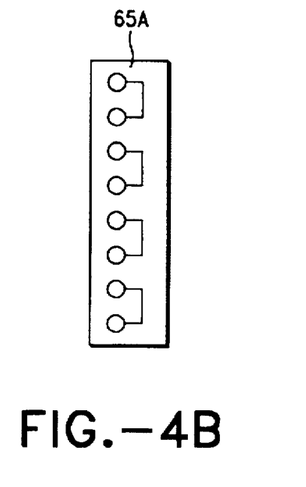

A description will now be given with respect to the operation in the case where switchboard 65a wired as shown in FIG. 4(B) is inserted into slot 64 which is connected as described above. Switchboard 65 of this example is formed of a small flexible board such as disclosed in Japanese Utility Model Application No. 4-21624. It may be easily inserted into or pulled out from slot 64 which is formed as an eight-terminal switch connector. Switchboard 65a is a switchboard which is wired to connect adjoining pins. When it is inserted into slot 64, adjoining pins are connected in pairs in their order so that pins 64a and 64b, for example, are connected to each other and pins 64c and 64d are likewise connected to each other. Accordingly, when the DSA signal and the MONA signal are activated at host 30, the DSA signal is supplied to control IC 21 from pin 64b which is connected to pin 64a, and the MONA signal is supplied to control IC 21 from pin 64h which is connected to pin 64g. Thereby, the motor of FDD 1 is driven and the connection between FDD 1 and the host is established. At this time, since the MONA signal is not input to control IC 22 of FDD 2, the motor of FDD 2 is not driven and no connection is established between FDD 2 and the host. On the other hand, when the DSB signal and the MONB signal are activated at host 30, the DSB signal and the MONB signal are input to control IC 22 of FDD 2 through the internal connection wiring in a manner opposite to the above, where the motor of FDD 2 is turned on and exchange of data between FDD 2 and the host becomes possible. At this time, exchange of data between FDD 2 and the host is effected through the interface of FDD 1 in the manner as described above.

Figure 4C:
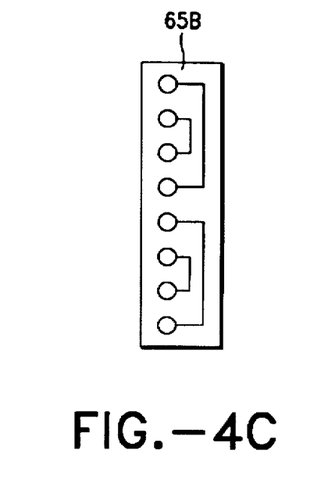

A description will now be given with respect to the case where, instead of using switchboard 65a, a switchboard 65b as shown in FIG. 4(C) is inserted into slot 64. Switchboard 65b is wired in such a manner as to connect pin 64a to pin 64d and to connect pin 64b to pin 64c. Similar connections are made to pins 64e–64h. Thus, when the DSA signal and the MONA signal are activated from the side of host 30, the DSA signal is supplied to control IC 22 from pin 64d which is connected to pin 64a and the MONA signal is supplied to control IC 22 from pin 64f which is connected to pin 64g. Thereby, the motor of FDD 2 is driven and connection between FDD 2 and the host is established. At this time, in a similar manner as the above, the DSA signal and the MONA signal are not input to control IC 21 of FDD 1. On the other hand, when the DSB signal and the MONB signal are activated from host 30, the DSB signal and the MONB signal are input to control IC 21 of FDD 1 in a manner opposite to the above, where the motor of FDD 1 is turned on and exchange of data between FDD1 and the host is effected. In this manner, by replacing switchboard 65a with switchboard 65b, setting of FDD 1 and FDD 2 may be easily changed.

Further, since setting of FDD 1 and setting of FDD 2 can be simultaneously changed, it is also possible to prevent the problem that only the setting of one is changed and access is made to both FDD 1 and FDD 2. Furthermore, since the MON signal is also changed over, separate MON signals may be supplied to FDD 1 and FDD 2, respectively. In the conventional example, two sets of interface cable have been required to connect to the host and it has also been necessary to have a twist on one of them. In the device according to the present invention, however, one set of cable suffices and, twisting is not required. For this reason, the connection in the recording device of this example is very simple and occurrence of such troubles as a connection failure is less likely. Setting and change of signals for selecting a drive are also simple and setting is not likely to be mistaken, since it suffices to insert the switchboard into FDD 1.

Further, it is also possible to form circuits corresponding to the above described switchboards 65a and 65b, respectively, at different surfaces or different end portions of one switchboard, and thereby its handling is facilitated because changing over may be effected by simply changing the manner in which the one switchboard is inserted. Furthermore, while, in the above embodiment, an internal connector is provided for each of FDD 1 and FDD 2, a normally provided signal or power interface may be used instead of the internal connector of FDD 2 to provide the connection therefrom to FDD 1. This will be described in detail in the following embodiment.

Embodiment 2

Figure 5:
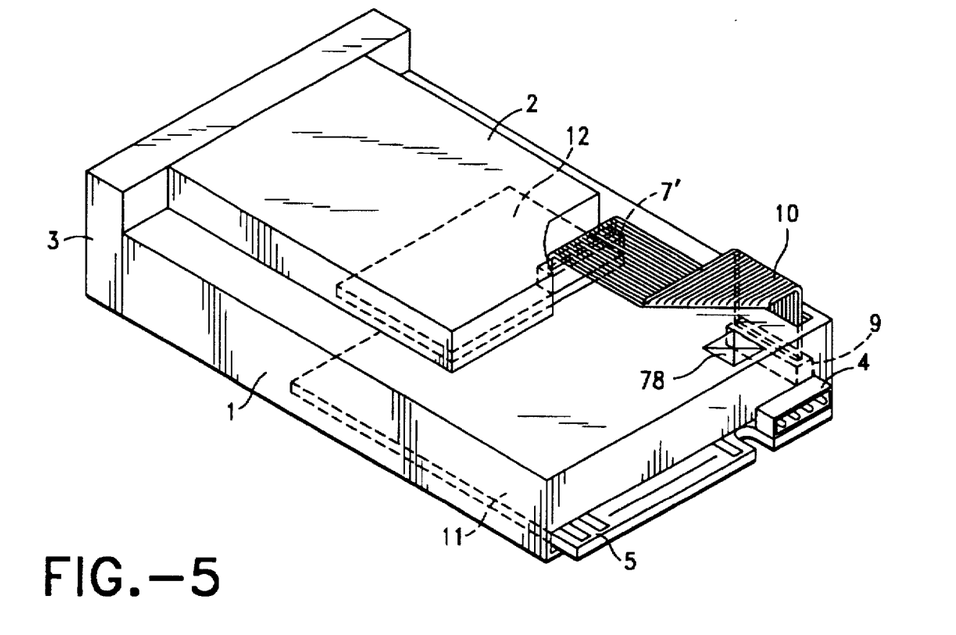
FIG. 5 is perspective view showing a recording device according to Embodiment 2 of the present invention, as seen from a rear side of the device, and illustrating the connection of the two recording sections.

Shown in FIG. 5 is a recording device according to another embodiment of the present invention. The recording device of this example also has a 5.25-inch FDD 1 and a 3.5-inch FDD 2 mounted thereon and is formed as an FDD unit of the dual structure in which the respective mediums may be inserted from front bezel 3. A signal interface card edge 5 and a power interface connector 4 are provided on a control board unit (PCB) 11 of FDD 1, so that by connecting them to a host side, the recording device may be operated by receiving power from the host side and exchange of data is possible. A connection connector 7' incorporating a signal interface and a power interface is provided on a control board unit (PCB) 12 of FDD 2. Connection connector 7' is connected to an internal connector 9 of PCB 11 by means of a flat cable (FCC) 10. A separate internal connector is not provided on PCB 12 of this example. The internal connection between FDD 1 and FDD 2 is effected by using connector 7' by means of which FDD 2 may usually be connected to a host equipment which corresponds to the 3.5-inch type. In the device of this example, internal connector 9 is provided at a side end portion of PCB 11, so as not to cause an interference with interfaces 5, 4 which are provided for communication with the outside. Further, connector 9 and connection connector 7' provided at the rear end portion of FDD 2 are connected to each other through flat cable 10. Flat cable 10 is bent at a mid-point to change the direction of the connecting ends at the two ends by 90°, so as to facilitate its insertion into the respective connectors 9, 7'. Also, it is not likely that the connected flat cable will bulge out from the recording device. Further, a setting switch 79 to be described later is mounted in the vicinity of internal connector 9, and an opening 78 for operating switch 79 is provided at a position on the case cover of FDD 1.

Figure 6:
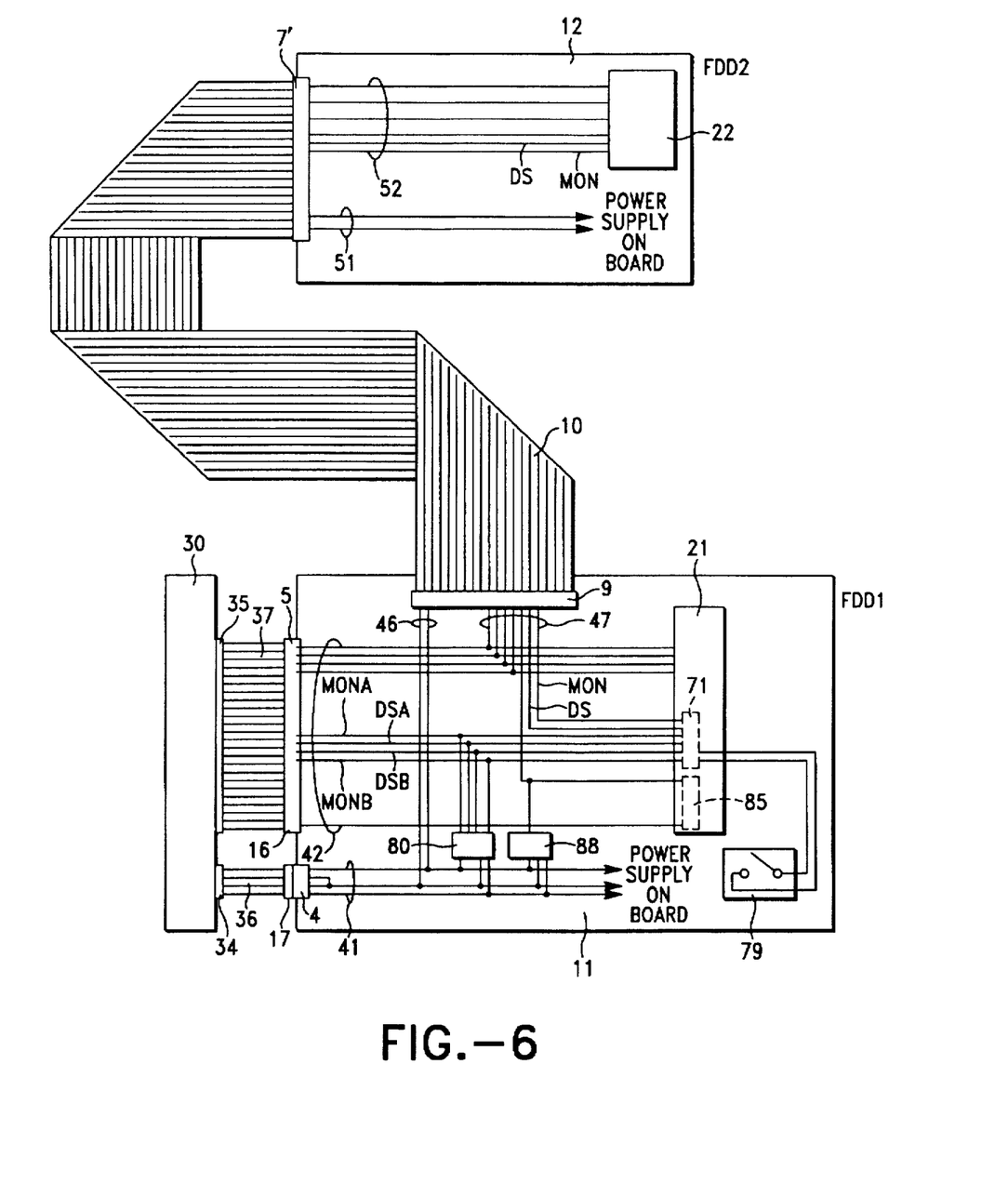
FIG. 6 is a circuit diagram showing an internal connection of the recording device in FIG. 5.

As shown in FIG. 6, the connection wiring of PCB 11 and PCB 12 are substantially identical to the above described embodiment. Thus, like portions are denoted by like reference numerals and description thereof will be omitted. In the recording device of this example, an internal connection wiring is not provided on PCB 12, since an internal connector is not separately provided on FDD 2. Its connection with FDD 1 is totally provided through connection connector 7'. In a similar manner as with board 11 of the above described recording device, signal wiring 42 and power wiring 41 of PCB 11 are connected to internal connection wirings 47, 46 within relay region 45 in such a manner as to adapt to the array of connections on connector 7' of PCB 12. Internal connection wirings 46, 47 are connected to internal connector 9, and FCC 10 is connected to internal connector 9.

The signal lines for supplying DSA, DSB, MONA, MONB on PCB 11 of this example are input to control IC 21 of FDD 1. A logical block 71 is provided within control IC 21. The FDD to which connection is to be made with the host side is set by logical block 71. The wiring for supplying DS signal and MON signal to be input to control IC 22 of FDD 2 is output from logical block 71 and is supplied to PCB 12 from control IC 21 through internal connector 9. Details of logical block 71 will be described below by way of FIG. 7.

Figure 8:
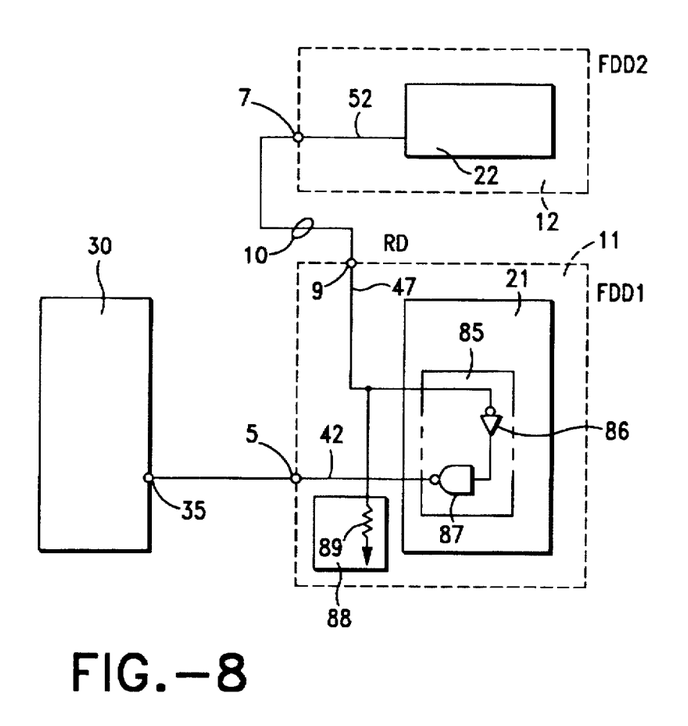
FIG. 8 illustrates an example of the construction of an output interface of the recording device in FIG. 5.

Pull-up circuits 80, 88 are also provided on PCB 11. While pull-up circuit 80 is also mounted on the foregoing recording device, it is shown in this figure to describe pull up of output signals. In FIG. 8, wiring for supplying a read data signal (RD signal) which is an output interface signal of FDD 2 is also shown. In the recording device of this example, the wiring for supplying the RD signal from FDD 2 is input to a driver circuit 85 within control IC 21 of FDD 1 through internal connector 9. The output from driver circuit 85 is provided to host side 30 through signal interface connector 5 via signal wiring 42. Pull-up circuit 88 is adapted to be capable of pulling up the circuit for supplying the RD signal to control IC 21 from FDD 2. The details will be described below by way of FIG. 8.

Figure 7:
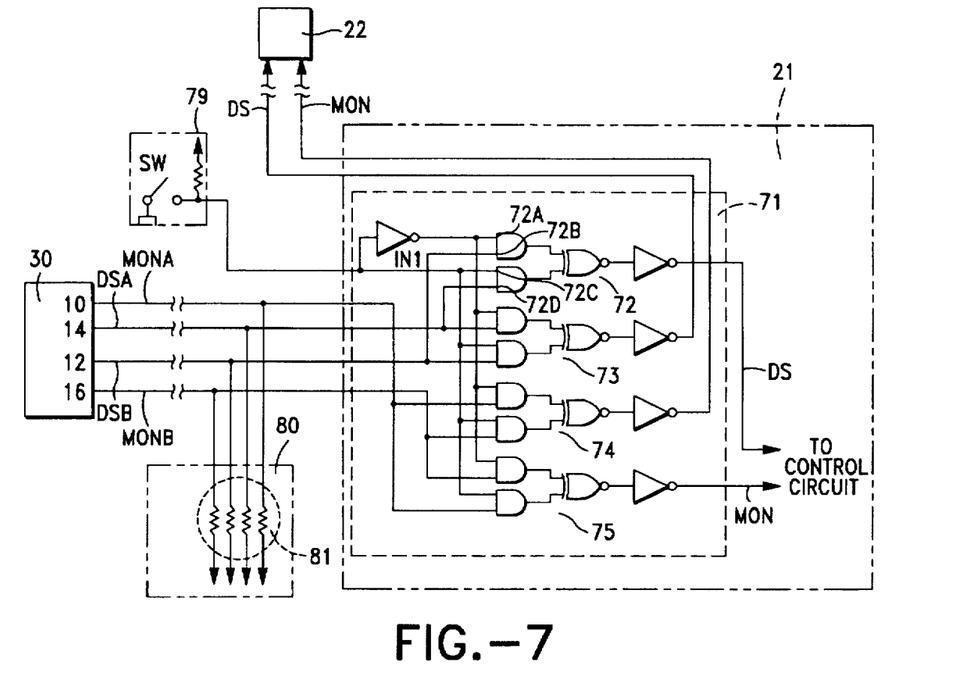
FIG. 7 is a circuit diagram showing a logical block for connecting the two recording sections of the recording device in FIG. 5.

The construction of logical block 71 provided in control IC 21 of this example is shown in FIG. 7 using logic gates. Logical block 71 is constituted by four selectors 72–75, each selector being constructed, for example, by two AND gates that are input in parallel to a NOR gate. The signal to be selected by selectors 72–75 is controlled by a setting switch 79. Specifically, when setting switch 79 is closed, a signal of high level is supplied to a terminal 72a of selector 72 while a signal of low level is supplied to a terminal 72c. When setting switch 79 is opened, signals of the opposite level are supplied.

In a similar manner as in the above described embodiment, respective signals of MONA from pin No. 10, DSA from pin No. 14, DSB from pin No. 12, MONB from pin No. 16 are supplied from host 30 as an open-drain output. The wiring for supplying DSA signal, etc. is connected to a 5 V line of the board power supply through a pull-up resistor 81 of pull-up circuit 80, so that a high level signal is input to logical block 71 when the host side is open. In the following, description will be given on the assumption that signals are active when they are at their high level. The DSA signal and DSB signal are input to selectors 72 and 73, and one of these signals is output from selector 72 or 73, depending on the position of setting switch 79. The output from selector 72 is connected to a control circuit within control IC 21 to supply a DS signal for selecting FDD 1. The output from selector 73 is brought to the outside of control IC 21 and is supplied to control IC 22 of FDD 2 as a DS signal for selecting FDD2 through the internal connection wiring.

The MONA signal and MONB signal are similarly transferred. The MONA signal and MONB signal are input to selectors 74 and 75, and one of these signals is output from selectors 74 or 75 depending on the position of setting switch 79. The output from selector 74 is brought to the outside from control IC 21 and is supplied to control IC 22 of FDD 2 as a MON signal for controlling the motor of FDD 2. The output from selector 75 is supplied to a control circuit within control IC 21 as a MON signal for controlling the motor of FDD 1.

For example, when setting switch 79 is in its closed position, the output of selector 72 is driven to its low level only when the DSB signal is at its high level, so that it is inverted by a buffer and a high level DS signal is supplied to the control circuit of FDD 1. Thus, an access between FDD 1 and the host is established by the DSB signal.

At selector 73, a high level DS signal is supplied to control IC 22 of FDD 2 through a buffer only when the DSA signal is at its high level. Thus, an access between FDD 2 and the host is established by the DSA signal.

At selector 74, a high level MON signal is supplied to control IC 22 of FDD 2 through a buffer only when the MONA signal is at its high level. Thus, the motor of FDD 2 is operated by the MONA signal.

At selector 75, a high level MON signal is supplied to a control circuit in control IC 21 through a buffer only when the MONB signal is at its high level. Thus, the motor of FDD 1 is operated by the MONB signal.

When setting switch 79 is brought to its open position, the DSA signal, etc. to be selected by selectors 72 - 75 become opposite of the above. Thus, the DSA signal is selected at selector 72 and access between FDD 1 and host 30 is established by the DSA signal. Similarly, the DSB signal at selector 73, the MONB signal at selector 74, and the MONA signal at selector 75 are respectively selected. In a similar manner as in the embodiment which has been described by way of FIGS. 3 and 4, such problems as concurrent access to both FDD 1 and FDD 2 would not occur even when the setting is changed in this manner.

While the device of this example is constructed so that setting switch 79 is manually operated, it is also possible to operate it by a signal from host 30. In such a case, setting of FDD 1 and FDD 2 may be changed at will through the system on the side of host 30.

In FIG. 8, the connection route of the RD signal to be output to host 30 from control IC 22 of FDD 2 is shown in isolation. Not only the RD signal, but also signals for output interface such as index signal, track 00 signal, and write protect signal are output from FDD 2 to the side of host 30. These signals are open-drain outputs which, in the conventional example, are the signals to be pulled up at the host side. In this embodiment, however, as represented by the RD signal, the signals output from control IC 22 of FDD 2 are transmitted to FDD 1 through interface connector 7' of FDD 2, FCC 10, and internal connector 9. Further, from internal connector 9 they are input to driver circuit 85 within control IC 21 of FDD 1 through internal connection wiring 47. Pull-up circuit 88 is connected to internal connection wiring 47 at a point before it is input to driver circuit 85, so that the open-drain output can be pulled up by the board voltage 5 V by means of pull-up resistor 89. The RD signal input to driver circuit 85 is input to a driver 87 through a buffer 86, so that output driver 87 is turned on and off. Although it is not shown, output driver 87 also serves as the RD output driver of FDD 1. The open-drain output of output driver 87 is brought out from control IC 21 and is transmitted to signal output interface connector 5 through signal wiring 42 and then to host 30. Thus, the open-drain output of output driver 87 is pulled up by the host side.

In the recording device according to the present invention, an output signal of FDD 2 which is internally connected to FDD 1 is once received at FDD 1, and it is newly formed into an open-drain output at FDD 1 to be output to the host side. Thus, for the portion between FDD 1 and FDD 2, i.e., within the recording device, the signal is pulled up by pull-up circuit 80 within the device. What is pulled up at the side of host 30 is the portion of driver circuit 85 and after. For this reason, it is possible to make smaller the switching current flowing through the signal wiring between FDD 2 and FDD 1, so as to greatly reduce noise. In the case where FDD 1 and FDD 2 are separately connected as in the conventional recording device, since the output signal of FDD 2, too, is pulled up at the host side, a large switching current is caused to flow and is a main cause of noises within the device. Thus, by employing the construction according to the present invention, the internal noise which has been a problem in recording/regeneration to/from a floppy may be greatly reduced, thereby a recording device with a high reliability may be provided. Output driver circuit 85 may also be constructed as the circuit common for both FDD 1 and FDD 2. In other words, it is possible to have the construction in which the output interface is shared by a plurality of FDDs.

While driver circuit 85 and logical block 71 are additionally provided in the present embodiment to reduce noise and to facilitate setting of FDDs, it is easy to integrate them to the inside of the control IC. Thus, increase in size of PCB 11 of FDD 1 or complicated structure thereof due to these circuits will not occur.

In the recording device according to the present invention as described by the above embodiments, despite the fact that it is provided with a plurality of recording mediums, its connection with a host may be provided through one set of connection in a similar manner as the recording device capable of mounting only one recording medium. It is not necessary to additionally provide a daisy chain connection between the host and the plurality of recording mediums. Further, since control of each motor is independently performed, twisting or the like of the connecting cable is not required. Setting of signals for respectively selecting a plurality of FDDs may be readily and securely performed by a switch, switchboard or logical block which is provided within the device, for example, on the board of FDD 1. Such an error as setting both FDDs, for example, to DSA may be prevented.

In the recording device according to the present invention, even when a plurality of recording mediums of different types are mounted, its connection with a host may be provided by one set of connection and an additional board such as an adapter board for achieving a compatibility with a different recording medium is not required. Accordingly, the number of components of the recording device according to the present invention is reduced to save space on the board and to achieve a reduction in the size of the device.

Further, the board of the recording medium connected to the host side, for example, the board of FDD 1 in the above embodiments, may be used also as an output buffer. Thereby, on the other FDD connected to the FDD 1, a small current suffices as the switching current of the output driver. The electromagnetic field due to the switching current is a cause of noise in a magnetic head or the like of the FDD, and the extent of such noise is proportional to the value of the switching current. Accordingly, reducing of the level of the switching current leads to a great reduction of the internal noise, resulting in substantial improvement of the performance of the recording device. Further, there is also an advantage that noise caused by fluctuation of power supply voltage due to switching current may be reduced.

The recording device according to the present invention having the above advantages is not limited to the above described recording device having FDD 1 and FDD 2 mounted thereon. Not only floppy disks but also various other types such as optical disks, CDs, ROM cards and RAM cards may be used as the recording mediums. Further, the number of the recording mediums is not limited to two. Furthermore, the circuit constructions such as the connection circuit construction and the logical block construction are not limited to those of the above described embodiments.

The recording device according to the present invention can be used as an external storage device of an information processing device such as a computer. The recording device is capable of having a plurality of recording mediums such as floppy disk, optical disk, and RAM card. It is suitable to replace a conventional recording device with the recording device of the present invention, since, especially in the recent years, recording devices have been reduced in their size.

While the invention has been described in conjunction with several specific embodiments, it is evident to those skilled in the art that many further alternatives, modifications and variations will be apparent in light of the foregoing description. Thus, the invention described herein is intended to embrace all such alternatives, modifications, applications and variations as may fall within the spirit and scope of the appended claims.

What is claimed is:

1. A recording device for communicating with an external device, comprising:

first recording means for exchanging data with a first recording medium, said first recording means including coupling means for coupling to and receiving signals from the external device;

second recording means for exchanging data with a second recording medium;

internal connection means connecting said first recording means to said second recording means, so that said second recording means is accessible by the external device through said first recording means; and, wherein said internal connection means includes connection conversion means connecting selected signals received from the external device through said coupling means of said first recording means to said second recording means to establish an access between the external device and said second recording device; and, wherein said selected signals include power supply signals; and further comprising switching means, coupled to said coupling means to receive first and second selection signals from the external device, for providing one of said selection signals to select and operate one of said first and second recording means, said switching means being disposed in one of said first and second recording means; and wherein said switching means includes a slot and a switchboard removably inserted into said slot, said switchboard having a preset connection pattern connecting said first and second selection signals to said first and second recording means such that at any one time during the operation of the device only one of said first and second recording means is supplied with one of said first and second selection signals.

2. The device of claim 1 wherein said coupling means is compatible with the external device.

3. The device of claim 1, wherein said coupling means of said first recording means includes an external connector on one end portion of said first recording means for connecting to the external device and said first recording means includes an internal connector on a one side portion;

wherein said second recording means includes an internal connector on a one side portion; and wherein said internal connection means includes a flat cable connecting said internal connector of said first recording means to said internal connector of said second recording means.

4. The device of claim 1 wherein said switching means is disposed in said first recording means.

5. The device of claim 1 wherein said first and second selection signals include first and second sets of signals, respectively.

6. The device of claim 5, wherein said switching means includes:

selection means, coupled to said coupling means to receive first and second sets of signals from the external device for operating said first and second recording means, for providing one of said two sets of signals to select and operate one of said two recording means at any one time during the operation of the device.

7. The device of claim 6, wherein said switching means further includes setting means, coupled to said selection means, for providing a setting signal to control said selection means so that a predetermined one of said first and second recording means is accessed by the external device when a predetermined one of said two sets of signals is activated by the external device at the time when said setting signal is a predetermined value.

8. The device of claim 7 wherein said setting means includes a manually operable switch.

9. The device of claim 7 wherein said setting means provides said setting signal in response to a control signal from the external device.

10. The device of claim 7, further comprising drive means disposed in one of said first and second recording means for buffering and communicating output signals from said second recording means to the external device.

11. The device of claim 10 wherein said switching means and said drive means are disposed in said first recording means.

12. The device of claim 10, further comprising first pull-up means disposed in said first recording means and coupled to input terminals of said drive means for pulling up open-drain output signals from said second recording means.

13. The device of claim 12, further comprising second pull-up means disposed in said first recording means and coupled to said selection means for pulling up open-drain output signals from the external device.

14. The device of claim 10, further comprising first pull-up means disposed in said first recording means and coupled to input terminals of said drive means for pulling up open-collector output signals from said second recording means.

15. The device of claim 12, further comprising second pull-up means disposed in said first recording means and coupled to said selection means for pulling up open-collector output signals from the external device.

* * * * *